United States Patent [19]
Mullins

[11] Patent Number: 5,092,364
[45] Date of Patent: Mar. 3, 1992

[54] QUICK-ACTION FLUID COUPLING

[75] Inventor: Randall J. Mullins, Matthews, N.C.

[73] Assignee: Perfecting Services, Inc., Charlotte, N.C.

[21] Appl. No.: 717,698

[22] Filed: Jun. 20, 1991

[51] Int. Cl.[5] ............................................. F16L 37/28
[52] U.S. Cl. .............................. 137/614.05; 285/316; 285/29
[58] Field of Search .............. 137/614, 614.02, 614.03, 137/614.04, 614.05, 614.06; 285/316, 315; 251/89.5, 149.9

[56] References Cited

U.S. PATENT DOCUMENTS

| Re. 23,120 | 6/1949 | Earle et al. | 285/277 |
|---|---|---|---|
| 2,377,812 | 6/1945 | Scheiwer | 285/316 X |
| 2,552,543 | 5/1951 | Earle et al. | 285/316 X |
| 2,690,918 | 10/1954 | Holte | 285/316 X |
| 3,023,030 | 2/1962 | Torres | 285/316 X |
| 3,039,794 | 6/1962 | Cenzo | 285/316 X |
| 3,100,655 | 8/1963 | Work | 285/316 X |
| 3,314,696 | 4/1967 | Ferguson et al. | 285/316 X |
| 4,114,853 | 9/1978 | Medvick | 285/316 X |
| 4,350,321 | 9/1982 | Berg | 285/316 X |
| 4,543,993 | 10/1985 | Calvin et al. | 285/316 X |
| 4,546,956 | 10/1985 | Moberg | 285/316 X |
| 4,582,347 | 4/1986 | Wilcox et al. | 285/316 X |
| 4,865,292 | 9/1989 | Ekman | 285/316 X |

Primary Examiner—Martin P. Schwadron
Assistant Examiner—Kevin L. Lee
Attorney, Agent, or Firm—Bell, Seltzer, Park & Gibson

[57] ABSTRACT

A push-to-connect, pull-to-disconnect ball detent coupling has a socket, a plug, detent balls carried by the socket for holding the plug in coaxial coupled relation, and a collar with two interlocking sleeves forming a channel. The channel receives a spring biased plunger for moving the collar to actuate the detent balls. The collar is biased so that when the socket and plug are disconnected, the ball detents are not maintained in a fixed position. The plug enters the socket through an orifice in the plunger and engages the balls and the plunger to compress the plunger spring. On further insertion of the plug into the socket, the retaining balls move inwardly into an annular groove on the plug and release the collar. The compressed spring then causes the collar to snap so that a projecting shoulder on the inner sleeve of the collar holds the balls in place in the annular groove in the plug and the socket and plug are locked in coupling engagement. To release the plug from the socket, an operator pushes the collar against the spring so that an annular groove on the inner surface of the collar comes into registry with the ball retaining apertures thereby releasing the balls from the annular groove in the plug. The spring in combination with spring biased valves in the flow passage through the coupling force the plug out of the socket.

20 Claims, 4 Drawing Sheets

QUICK-ACTION FLUID COUPLING

FIELD OF THE INVENTION

This invention relates to couplings for quickly joining or separating fluid conducting lines. More particularly, this invention relates to quick-action couplings for use in hydraulic fluid power systems.

BACKGROUND OF THE INVENTION

Hydraulic fluid power systems are used to operate a variety of machinery. Hydraulic systems transmit and control power for operating machinery by forcing water, oil, or other liquid under pressure through an enclosed circuit of fluid conducting lines. Quick-action couplings are used to quickly join or separate fluid conducting lines without the use of tools or special equipment.

The American National Standards Institute has published standard dimensions and requirements for *Hydraulic Fluid Power—Quick-action Couplings* in ANSI/B93.113M-1987. The ANSI Standard sets forth the interface dimensions and specifies basic performance requirements for two series of general-purpose hydraulic quick-action couplings, Series "A" and Series "B". Both series are in widespread use and have similar technological advantages. The International Standards Organization has also published the same standard dimensions and requirements for Series A and Series B couplings under the same title in ISO 7241. Couplings and coupling components made by various manufacturers in accordance with the Standards are interchangeable.

Quick-action couplings made according to the Standards comprise two primary components, or members: a generally cylindrical socket having an axial fluid flow passage that is attached to one hydraulic line and a generally cylindrical plug also having an axial fluid flow passage that is attached to the other. The plug is inserted into the socket to join the two lines and to create a single fluid flow passage between the lines.

Generally speaking, the socket has a plurality of evenly spaced locking balls contained in apertures that form a circle around the plug receiving end of the socket. A spring biased detent sleeve circumscribing the socket holds the locking balls radially inwardly. To insert the plug into the socket, the operator first uses one hand to pull the detent sleeve longitudinally away from the plug receiving end of the socket so that the balls are released. Using the other hand, the operator inserts the plug into the socket. The plug has an annular groove to receive the locking balls. The operator then releases the detent sleeve, which holds the balls in the annular groove in the plug and secures the plug in the socket. The operator removes the plug from the socket in an analogous fashion.

The interchangeable couplings described above have several disadvantages that detract from their usefulness. For example, the operator pulls the sleeve against the bias of a spring so that the plug can be inserted into and withdrawn from the socket. Machinery operators sometimes wear heavy rubber gloves that become oily in use and reduce the dexterity with which the sleeve can be manipulated. The coupling also requires the operator to use both hands to insert the plug into the socket. Using both hands reduces the speed with which the socket and plug can be connected and disconnected.

These disadvantages have caused problems in the operation of rescue equipment that is hydraulically powered, and, in particular, the operation of a rescue tool that is used for extracting victims from automobile wreckage. One such rescue tool is manufactured by Hurst Performance, Inc. under the trademark JAWS OF LIFE ®. The JAWS OF LIFE ® rescue tool uses two couplings to form a circuit, one in a hydraulic line transferring pressurized fluid from the power source to the tool and one in a return hydraulic line leading from the tool back to the power source. Difficulty has been encountered by the rescue operator in connecting and disconnecting the hydraulic lines at the couplings.

The couplings are generally oriented in different directions and are connected and disconnected one at a time. The rescuer uses both hands to connect each coupling. The rescuer pushes the sleeve longitudinally to release the retaining balls so that the plug can be inserted into the socket and secured and so that the plug can be withdrawn. Frequently, the rescue operator must take off his gloves to connect or disconnect the coupling, consuming even more time in critical moments.

The performance of rescue equipment depends in part upon its compatibility with the power source and in part upon the speed with which the equipment can be used. Coupling components should be manufactured in accordance with ISO 7241 for interchangeability so that the rescue equipment can be used with any available power source without having to change any of the coupling components, either in the hydraulic lines attached to the tool or in the hydraulic lines attached to the power source. The coupling components should also be easily and quickly connected and disconnected by the rescuer.

Snap couplings adapted for assembly and disassembly with one hand have been available in the past, but these couplings are not interchangeable with standard components and are not suitable for use in rescue equipment. For example, U.S. Pat. No. Re. 23,120 to C. E. Earle et al. and U.S. Pat. No. 2,377,812 to A. T. Scheiwer disclose such snap couplings. These patents both disclose a spring-biased detent-actuating sleeve carried by a socket. The mating plug engages a detent operator, or plunger, to bias the sleeve to actuate the detent. As viewed with the socket on the left, the springs are located entirely or at least partially to the right of the ball detents, which requires the socket to have a length to accommodate the spring and requires the plug to have a length to accommodate the distance between the ball detent and the plug receiving end of the socket. Such a coupling is not interchangeable with Standard components made according to ISO 7241, which do not provide the required length in the socket or plug.

It would be desirable to provide interchangeable couplings for use with hydraulically powered rescue equipment such as the JAWS OF LIFE ® rescue tool that are easily and quickly connected and disconnected by the rescuer. In particular, it would be desirable to provide a coupling that could be quickly and easily connected and disconnected with one hand while capable of withstanding the rigors of heavy use encountered in rescue operations, and at the same time being interchangeable with standardized components presently in use.

The present invention provides a quick-action fluid coupling having interchangeable components that can be connected and disconnected with one hand and can withstand the rigors of use with rescue equipment. The coupling components of the present invention are fully usable with coupling components presently in use that are manufactured according to the Standards, and do not require the replacement of existing components for compatibility of rescue equipment and power source. The present invention also provides a coupling assembly for connecting and disconnecting two couplings simultaneously, even further decreasing the time required to perform a rescue operation.

SUMMARY OF THE INVENTION

The present invention relates to a quick-action fluid coupling having push-to-connect, pull-to-disconnect features. The coupling can be installed in a fluid flow line to provide secure coupling under conditions of heavy usage such as is encountered with rescue equipment. Nevertheless, the coupling is easily connected and disconnected during use.

In one embodiment, the coupling comprises a first member having a coupling end and a second member having a coupling end for engaging the coupling end of the first member. The first and second members are generally cylindrical and have axial flow passages through them that define a single flow passage when the members are coupled in coaxial relation. The first member carries at least one detent for securing the second member in coaxial coupled relation with the first member. The second member includes a means for engaging the detent when the first and second members are engaged in coaxial coupled relation.

The first member also carries a collar that is longitudinally movable for alternately maintaining the detent in, and releasing the detent from, securing engagement with the second member. A first biasing means biases the collar toward the coupling end of the first member.

The collar has inner and outer sleeves that define a channel. The collar carries a plunger that is longitudinally movable in the channel. A second biasing means biases the plunger toward the coupling end of the first member. The plunger is adapted to be engaged by the second member. When the first and second members are engaged in coaxial coupled relation, the second member urges the plunger into the channel to in turn urge the collar to hold the detent in engagement with the means for engaging the detent that is on the second member. In this manner, the first and second members are secured in coaxial coupled relation. The operator can disconnect the first and second members by moving the collar against the second biasing means to release the detent.

In a more specific embodiment, the first member is a socket, the second member is a plug, and the detent comprises a plurality of ball detents. The socket has a plurality of apertures for holding the ball detents. The ball detents are movable radially inwardly and outwardly for the insertion of the plug into and removal of the plug from the socket and for coupling engagement of the plug and socket.

The collar carried by the socket provides a projecting shoulder to hold the balls radially inwardly for coupling engagement with the plug, and an annular groove to release the balls to move radially outwardly from the plug so that the socket and plug can be disconnected. The collar is spring biased against the socket so that when the socket and plug are not coupled then the annular groove is brought into registry with the ball retaining apertures and the balls are free to move radially outwardly.

The collar has an inner sleeve and an interlocking outer sleeve that form a channel between them for a spring biased movable plunger. The spring biasing the plunger against the collar is of relatively greater strength than the spring biasing the collar against the socket. When the plug is inserted into the socket, the plug engages the balls to urge them radially outwardly into the annular groove and to hold the collar in place while the plug also engages the plunger to compress the relatively stronger spring in the channel. On further insertion of the plug into the socket, the balls engage an annular groove on the plug and release the collar. The collar is then biased under the tension of the relatively stronger spring to snap longitudinally away from the plug receiving end of the socket and to bring the projecting shoulder on the inner surface of the collar into register with the ball retaining apertures. The projecting shoulder holds the balls in place in the annular groove on the plug thereby locking the plug and socket in coupling engagement.

To release the plug the operator simply pushes on the collar against the bias of the spring to move the annular groove on the collar in register with the ball retaining apertures to release the balls from the plug and to eject the plug from the socket.

Where two or more hydraulic lines are used simultaneously, then the coupling of the invention can be mounted in a coupling assembly for simultaneous release of the plug of each coupling from its socket. For two coupling connection and disconnection, the assembly includes a housing that is composed of two parts, each having a plug and a socket mounted for coupling engagement with a corresponding plug and socket on the other half of the housing. The couplings are connected by snapping the two parts of the housing together.

The housing has a cam with depending cam lugs that upon rotation by a handle actuated pivot shaft engages the detent collar of each coupling. The cam lugs push the collar to disconnect the plug and socket as described above for the single coupling. The housing may include a locking means to limit movement of the cam so that the coupling can be disconnected only by unlocking the locking means.

BRIEF DESCRIPTION OF THE DRAWINGS

FIGS. 3A-3F illustrate in sequence partial longitudinal sections of the plug of FIG. 1 being inserted into the socket of FIG. 1 for coupling engagement and then being released and withdrawn from the socket. FIGS. 3E and 3F illustrate the plug being released from the socket.

Corresponding reference characters indicate corresponding parts throughout the several views of the drawings.

DESCRIPTION OF THE PREFERRED EMBODIMENTS

The coupling and coupling assembly of the invention can best be understood with reference to the specific embodiments that are illustrated in the drawings and have been adapted for use in the JAWS OF LIFE ® power operated rescue tools. While the invention will be so described, it should be understood that the invention is not intended to be limited to the embodiments illustrated in the drawings, to hydraulically powered rescue equipment, or even to hydraulic fluid power systems. Those of ordinary skill in the art will recognize that hydraulic couplings can be adapted to pneumatic uses with certain modifications. On the contrary, the invention includes all alternatives, modifications, and equivalents that may be included within the spirit and scope of the invention as defined by the appended claims.

Figure 1:
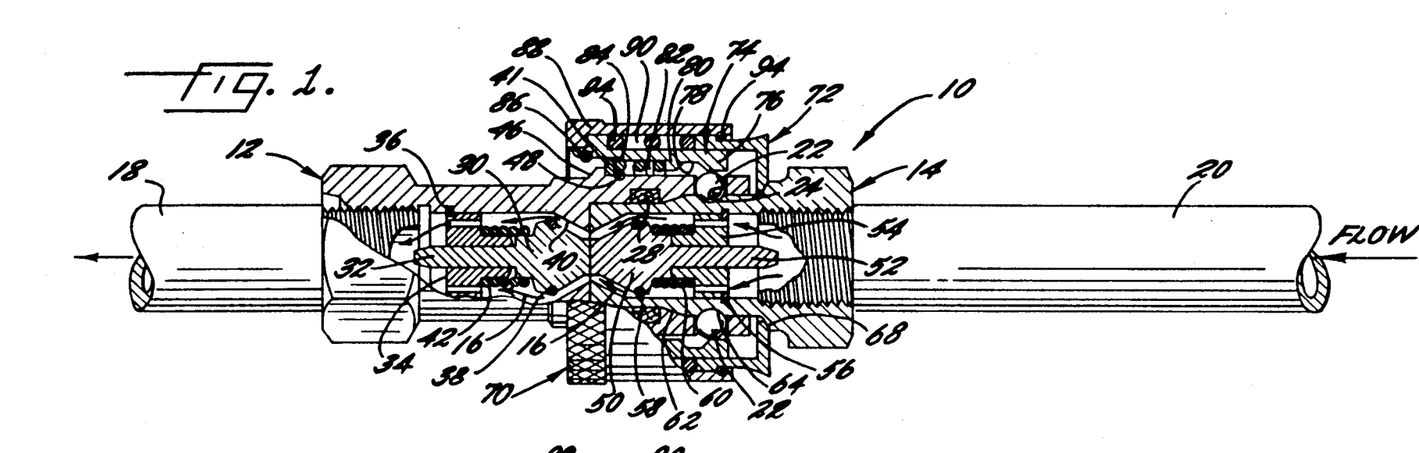
FIG. 1 illustrates in partial longitudinal section a representative coupling of the present invention having the plug fully inserted into the socket for coupling engagement.

FIG. 1 shows a coupling of the present invention broadly designated at 10 having a socket broadly designated at 12 and a mating plug broadly designated at 14 inserted in the socket and connected to the socket in coupled relation. The socket and plug are coupled to form a fluid flow passage 16 between a line 18 that is attached to the socket and another line 20 that is attached to the plug.

The plug and socket are connected in coupled relation by a plurality of ball detents 22 in ball retaining apertures 24 along the circumference of the socket. The ball retaining apertures are tapered toward the flow passage so that the balls are movable radially inwardly to the limit of the taper and are freely moveable radially outwardly with respect to the plug.

The socket includes a counter bore 26 for receiving the mating plug. A seal 28 is carried in the counter bore to engage the plug on insertion of the plug into the socket to substantially prevent fluid leakage from the flow passage when the plug and socket are coupled.

The flow passage of the socket contains a valve 30 that is biased to close the flow passage in the socket when the fittings are disconnected. The valve sits on a stem 32 that is carried by a spider 34. The spider is fixed in the socket by a snap ring 36. An O-ring washer 38 around the large diameter portion of the valve 30 engages the side wall 40 of the socket 12 to prevent fluid leakage when the plug is disconnected from the socket. A spring 42 biases the valve and causes the O-ring to engage the sidewall of the socket.

Socket 12 also includes a washer 41 fixed in place against a hexagonal flange 46 for a purpose to be explained later. The washer is held fast against the flange by a snap ring 48.

The mating plug 14 has a valve 50, a valve stem 52, a spider 54, a snap ring 56, an O-ring washer 58, and a spring 60 corresponding, respectively, to the valve, valve stem, spider, snap ring, O-ring washer, and spring of the socket 12 that substantially prevent fluid leakage from the plug when the plug and socket are disconnected.

The valve 50 in the plug cooperates with the valve 30 in the socket against the bias of springs 42 and 60 to open flow passage 16. When the plug and socket are coupled (FIG. 1).

The plug 14 includes a first annular ramp 62 (shown most clearly in FIGS. 2 and 3A) that cammingly engages the ball detents 22 and urges them radially outwardly as the plug is inserted into the socket 22. An annular groove 64 is provided on the plug for receipt of the balls and provides a neck by which the balls can hold the plug in coupled relation with the socket.

The plug also includes a second annular ramp 66 that forms one of the sidewalls of the annular groove 64 (FIG. 2) for cammingly engaging the balls and urging them radially outwardly when the plug is removed from the socket. An annular shoulder 68 is also provided on the plug, the purpose of which is explained hereinbelow.

A collar 70 and plunger 72 circumscribe the socket 12 and provide a means for holding the balls 22 in the annular groove 64 of the plug 14 for maintaining the plug and socket in coupled relation and for releasing the balls from the socket and from the plug to disconnect the plug and socket.

The collar 70 has an inner sleeve 74 surrounding the socket. The inner sleeve has a projecting shoulder 76 that is shown in FIG. 1 in registry with the ball retaining apertures 24 and holding the balls in engagement with the annular groove 64 in the plug s that the plug and socket are fixed in coaxial coupled relation. Adjacent the projecting shoulder 76, the inner sleeve has an annular groove 78 for receiving the balls and for engaging the balls to hold the inner sleeve in place while the ramp 62 on the plug urges the balls radially outwardly as the plug is inserted into the socket. The washer 41 on the socket and a flange 80 on the inner sleeve 74 form the end points of a passage 82 between the socket and sleeve. The passage contains a helical compression spring 84 that biases the sleeve against the washer 41 toward the plug receiving end of the socket so that when the plug and socket are disconnected, then the annular groove 78 in the sleeve is held in registry with the ball retaining apertures. The sleeve is limited in further longitudinal movement in the direction of the plug receiving end of the socket by a snap ring 86 that engages the washer 41.

An outer sleeve 88 surrounds the inner sleeve 74 and engages it in interlocking relationship to form a channel 90 between the inner and outer sleeves. The inner sleeve 74 and the outer sleeve 88 can be press fit, but it is more convenient from a manufacturing standpoint if the inner and outer sleeves are not press fit.

Figure 2:
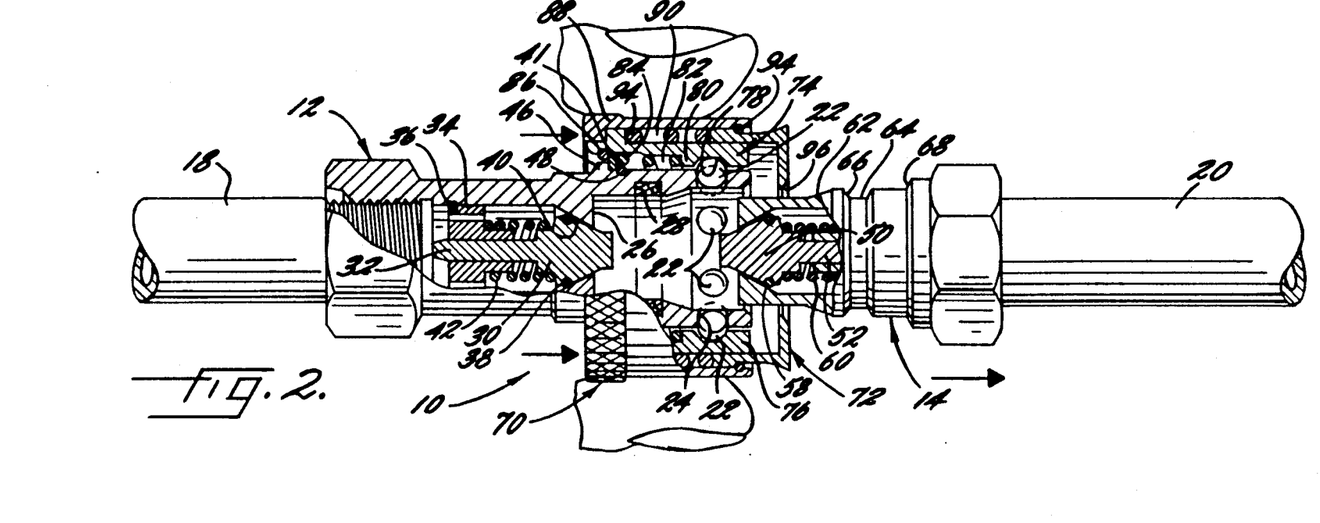
FIG. 2 is a view similar to FIG. 1 in which the plug has been released from the socket and is largely withdrawn from the socket.

An annular plunger 72 is movable in channel 90 and is biased by a helical compression spring 92 in the channel. Helical compression spring 92 is of relatively greater strength than spring 84. Movement of the plunger out of the channel is prevented by a snap ring 94. The spring 92 biases the plunger 72 toward the plug receiving end of the socket 12. The plunger contains an orifice 96 (FIG. 2). The plug 14 is inserted into and withdrawn from the socket 12 through orifice 96.

FIG. 2 shows the coupling 10 of the present invention with the socket 12 and plug 14 disconnected and the plug being withdrawn from the socket. It can be seen that the spring biased valves 30 and 50 have closed the plug 14 and the socket 12, respectively. Additionally, the collar 70 has been pushed longitudinally toward the plug receiving end of the socket 12 so that the annular groove 78 in the inner sleeve 80 has been moved into registry with the ball retaining apertures 24. The ball detents 22 have been released from the annular groove 64 on the plug so that the plug can be ejected from the socket. In FIG. 2, the ramps 62 and 66, the annular groove 64, and the annular shoulder 68 on the plug can be seen clearly.

Figure 3A:
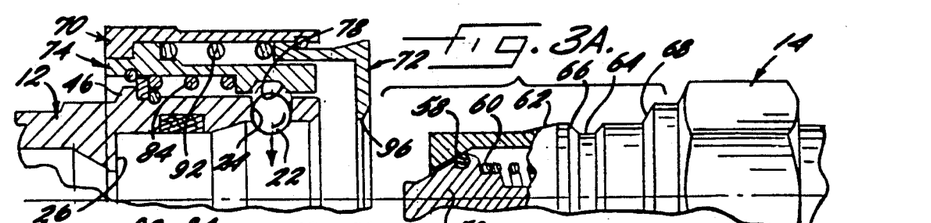
FIG. 3A illustrates the disconnected plug and socket oriented for coupling.

FIGS. 3A through 3F show how the components of the coupling cooperate for connecting the socket and plug in coupling engagement and for releasing the plug from the socket. FIG. 3A shows the plug 14 and socket 12 prior to insertion of the plug into the socket. The plunger spring 92 has biased the plunger 72 to the limit of its path of travel toward the plug receiving end of the socket in the channel 90 between the outer sleeve 88 and the inner sleeve 74. The inner sleeve spring 84 has biased the inner sleeve 74 to the limit of its travel toward the plug receiving end of the socket so that the annular groove 78 on the inner sleeve is in registry with the ball retaining apertures 24. The ball 22 is shown in a resting position at the limit of the taper of aperture 24.

Figure 3B:
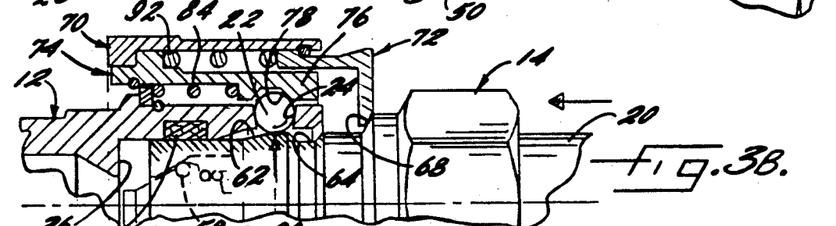
FIGS. 3B and 3C illustrate the plug at various stages of insertion into the socket.
Figure 3C:
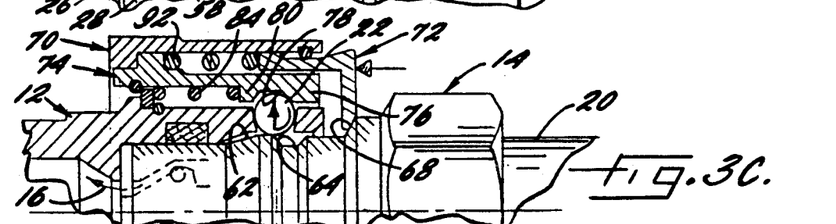
Figure 3D:
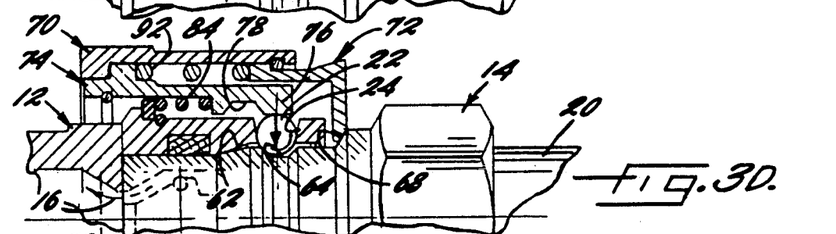
FIG. 3D illustrates the plug fully inserted into the socket for coupling engagement.

FIG. 3B illustrates that as the plug is being inserted into the socket the ramp 62 on the plug cammingly engages the balls 22 to urge the balls radially outwardly into engagement with the annular groove 78 on the inner sleeve 74. At the same time, the annular shoulder 68 on the plug engages the plunger 72 and, as shown in FIG. 3C, when the ball is at the uppermost portion of the ramp 62 on the plug, the plug has engaged the plunger 72 to compress spring 92. The valves 30 and 50 in the socket and plug, respectively, cooperate against the bias of springs 42 and 60 to partially open flow passage 16. When the plug is pushed further into the socket (FIG. 3D), the balls 22 drop into the annular groove 64 on the plug, releasing the inner sleeve 74. Since spring 92 is stronger than inner sleeve spring 84, spring 92 urges the inner sleeve 74 longitudinally away from the plug receiving end of the socket so that the projecting shoulder 76 on the inner sleeve engages the ball to hold the ball in the annular groove 64 on the plug. Flow passage 16 is now fully open and the plug and socket are connected in coupled engagement.

Figure 3E:
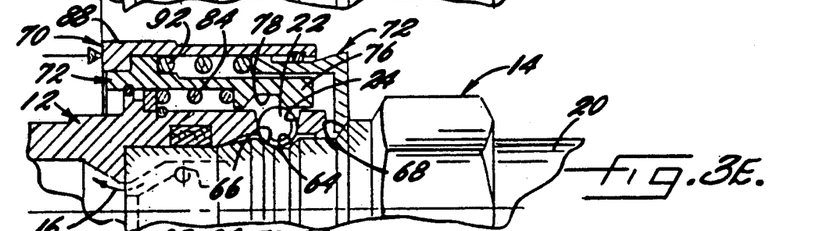

As shown in FIG. 3E, the plug 14 is disconnected from the socket 12 by pushing the collar 70 against the bias of spring 92 so that the annular groove 78 in the inner sleeve 74 comes into registry with the ball retaining apertures 24. The ramp 66 on the surface of the plug cammingly engages the ball and forces the ball radially outwardly out of the annular groove 64 on the plug and into the annular groove 78 on the inner sleeve to release the ball from the plug.

Figure 3F:
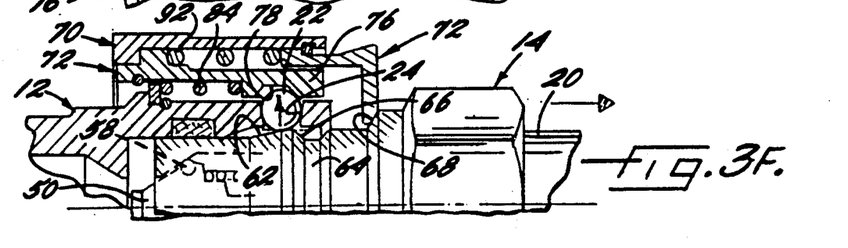

As shown in FIG. 3F, spring 92 and spring biased valves 30 and 50, which are under tension, are released to disconnect the plug and socket and force the plug out of the socket.

Figure 4:
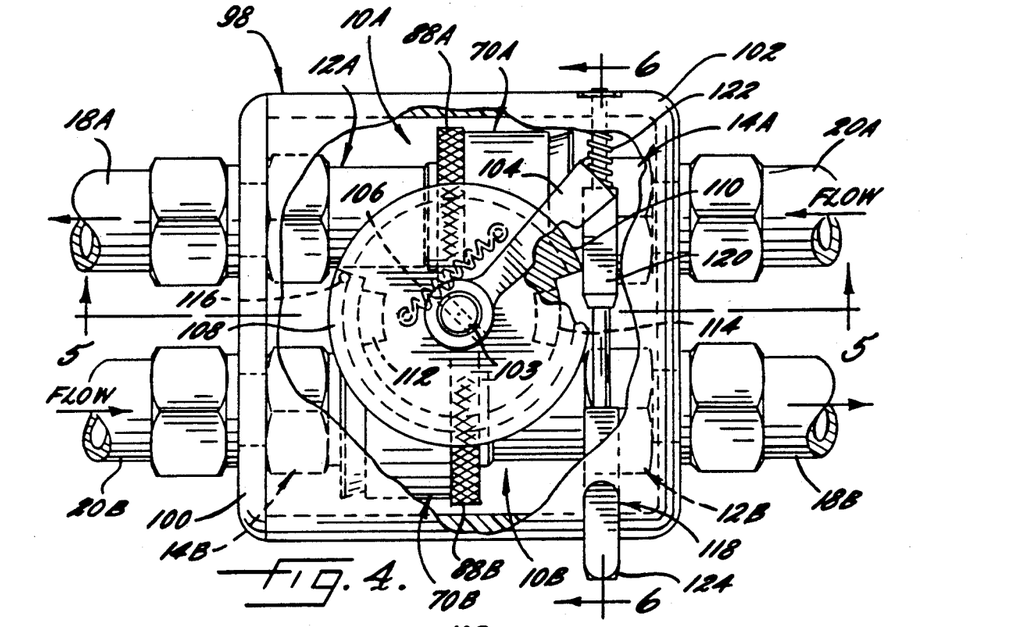
FIG. 4 illustrates a top partially broken away and sectional view of a representative embodiment of the present invention for simultaneous connection and disconnection of two of the couplings of the invention.

Turning now to a consideration of those embodiments of the invention in which multiple couplings are simultaneously connected and disconnected, FIG. 4 shows a coupling assembly in which two couplings broadly designated at 10A and 10B are incorporated into a housing 98. The housing consists of upper and lower parts 100 and 102 in which couplings 10A and 10B are mounted. Each housing part has a socket and a plug mounted to receive a corresponding plug and socket mounted in the other housing part.

Socket 12A, which is mounted in part 100, receives plug 14A, which is mounted in part 102. Socket 12B, which is mounted in part 102, receives plug 14B. As illustrated, coupling 10A joins socket line 18A and plug line 20A for flow in one direction. Coupling 10B joins socket line 18B and plug line 20B for flow in the opposite direction. As those of skill in the art will recognize, fluid flow can be in the same direction in each coupling, if desired, even though the couplings are oriented as shown in FIG. 4.

Part 102 of the housing includes a rotatable mechanism for disconnecting the sockets and plugs and allowing the portions of the housing to be separated. A pivot shaft 103 and rotatable handle 104, biased by a spring 106 that is contained within a cap 108 to return to its inoperative position, engages a cam 110 having depending cam lugs 112 and 114 (see FIG. 5). When rotated, the handle and shaft rotate the cam and causes cam lug 112 to engage outer sleeve 88A and cam lug 114 to engage outer sleeve 88B simultaneously. On further rotation of the handle, the cam lugs urge the collars against the bias of the springs to simultaneously disconnect the sockets and plugs as previously described with reference to FIG. 2 and FIGS. 3E through 3F.

After the sockets and plugs have been disconnected, the handle is released and spring 106 biases the handle and cam to return to an inoperative position. A stop pin 116 engages the cam to limit the rotation of the cam and handle under the bias of the spring in a manner that is described hereinbelow.

A key 118 is used to prevent inadvertent rotation of the handle and disconnection of the sockets and plugs except when desired. The key has a larger diameter portion 120 that is biased by a spring 122 to engage the cam to prevent its rotation. The operator depresses a button portion 124 of the key that extends to the exterior of the housing part 102 so that the key no longer engages the cam, and the cam can be rotated to disconnect the sockets and plugs.

Figure 5:
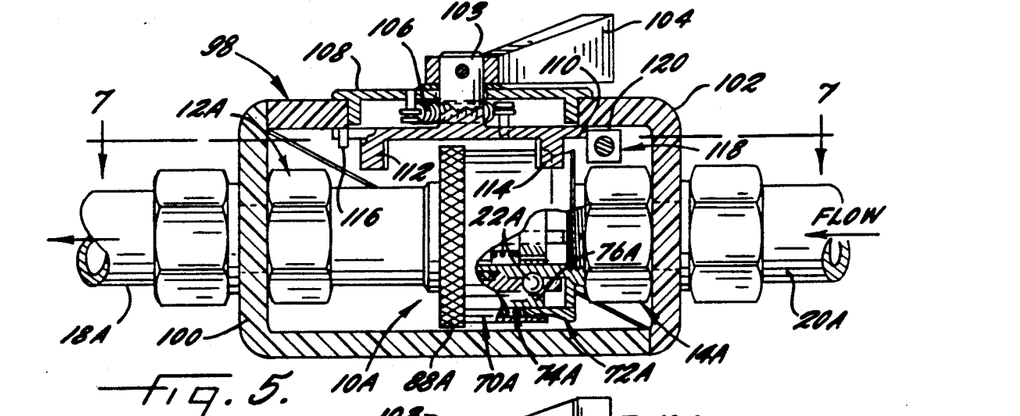
FIG. 5 is a cross-sectional side view of the embodiment of FIG. 4 taken along line 5—5 of FIG. 4. Portions outside the plane of the section are illustrated in partial section.

Turning now to other representative views of the two coupling assembly, FIG. 5 illustrates a side view cross-section of a housing taken along line 5—5 of FIG. 4 and showing coupling 10A with the plug and socket connected in coupling engagement and in partial cross section. The side walls of housing parts 100 and 102 are shown in substantially triangular, interlocking configuration and engaged along a diagonal.

Figure 6:
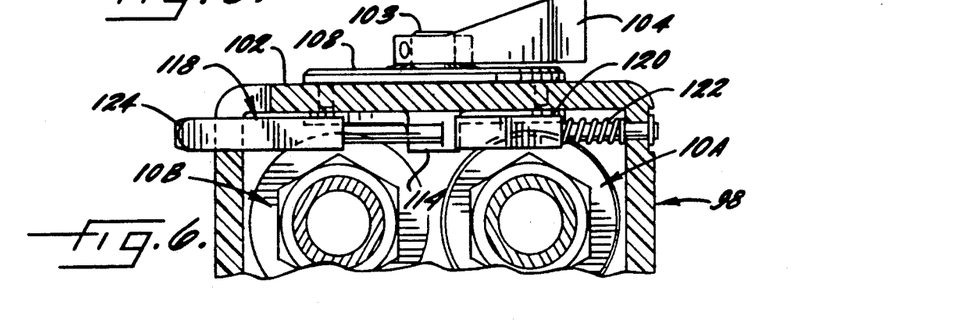
FIG. 6 illustrates an end cross-sectional view taken along line 6—6 of FIG. 4.

FIG. 6 illustrates in a partial section a view of the housing of FIG. 4 taken along line 6—6 of FIG. 4. Taken together, FIGS. 4, 5, and 6 show the orientation of the key 118 in the housing with respect to the cam and couplings.

Figure 7:
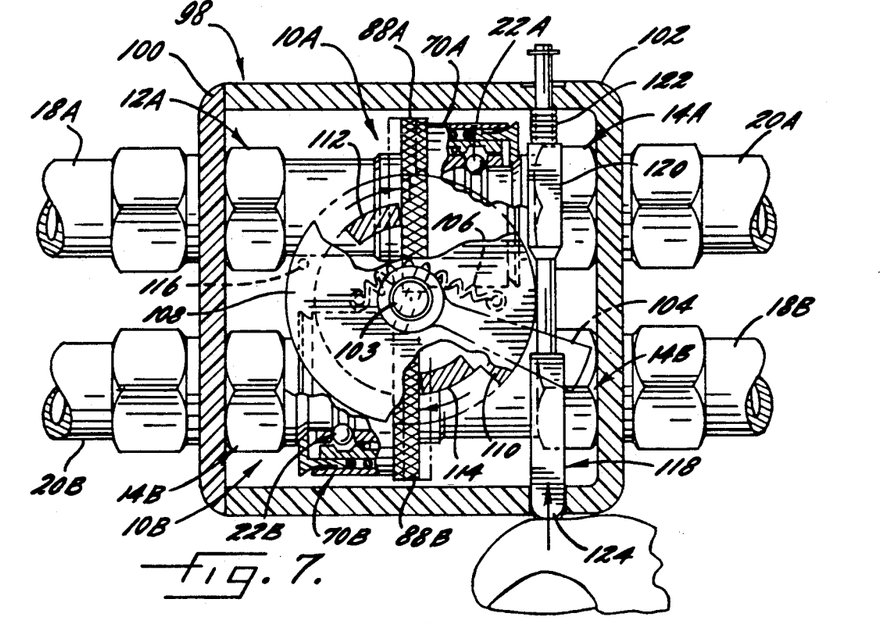
FIG. 7 illustrates a top cross-sectional view of the embodiment of FIG. 5 taken along line 7—7 of FIG. 5, with various components out of the plane of the section illustrated in partial section.

FIG. 7 illustrates a top cross-sectional view of the housing taken along line 7—7 of FIG. 5. Key 118 is depressed and the handle 104 and cam 110 are turned so that cam lug 112 engages plunger sleeve 88A and cam lug 114 engages plunger sleeve 88B. The plunger sleeves are shown having been moved toward the plug receiving end of the sockets so that the annular grooves 78A and 78B in the inner sleeves are in register with the ball retaining apertures 24A and 24B. The balls are released and the plugs can be disconnected.

Figure 8:
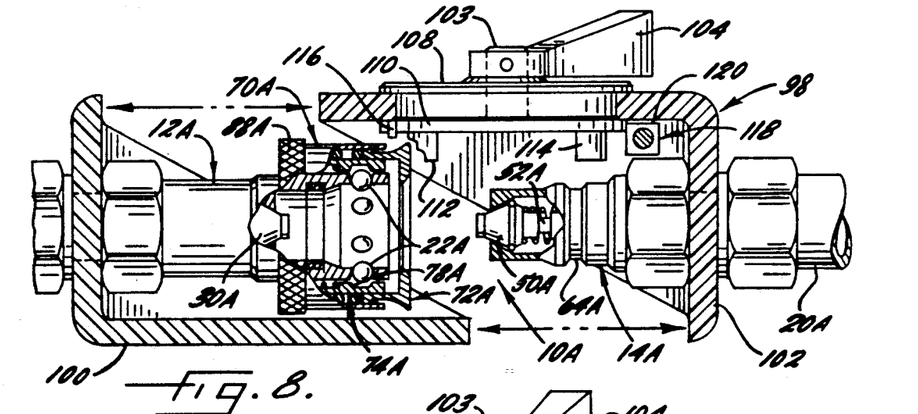
FIG. 8 illustrates a side cross-sectional view of the embodiment of FIG. 4 through FIG. 7 with the components separated.

FIG. 8 is a view similar to FIG. 5, but showing the two halves of the housing disconnected and the plugs and sockets are substantially as shown in FIG. 3A.

Figure 9:
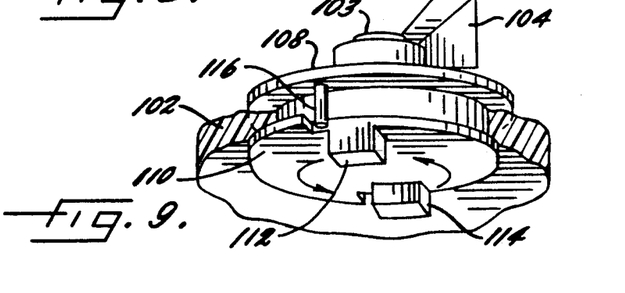
FIG. 9 is an elevational view of one of the components of the embodiment of FIG. 4 through FIG. 8.

FIG. 9 illustrates the handle 104, the cap 108, the cam 110, the depending cam lugs 112 and 114, and the stop pin 116. As illustrated, the cam is shown having a larger diameter portion and a smaller diameter portion providing a notch for engaging the cam stop pin 116. The cam stop pin 116 engages the notch to limit the rotational movement of the cam when the handle 104 is released and is biased by the spring 106 to return to the position that the handle and cam occupy when the sockets and plugs are connected.

When used in connection with the operation of the JAWS OF LIFE ® power operated rescue tools, the assembly illustrated in FIGS. 4–9 provides a hydraulic flow line to the tool and a return line. Even while wearing heavy gloves and under the time constraints of emergency procedures followed in a rescue operation to extract a victim from automobile wreckage, the rescue operator can quickly and easily depress key 118 and rotate the handle 104 to disconnect the sockets and plugs of couplings 10A and 10B and to separate housing part 100 from housing portion 102. The coupling can just as easily be reconnected by the same operator simply by pushing the two housing parts together. Additionally, the construction provides a sturdy coupling having a protected plunger element that is not easily damaged and provides a secure connection.

While the coupling of the invention has been described with respect to its use in the JAWS OF LIFE ® power operated rescue tools, those of ordinary skill of the art will recognize that the coupling can be used for a variety of fluid flow applications and is easily adaptable for either gas or liquid fluid flow applications. For example, a number of sockets and plugs can be mounted in fixed positions and can be simultaneously connected and disconnected quickly and easily by using the coupling of this invention.

The present invention has been described with specific reference to preferred embodiments. However, variations can be made within the spirit and scope of the invention as described in the foregoing specification and defined in the appended claims.

That which is claimed is:

1. A quick-action fluid coupling for fluid conducting lines, characterized by push-to-connect, pull-to-disconnect features, said coupling comprising:
   a generally cylindrical first member having an axial fluid flow passage therethrough, one end of said first member defining a coupling end;
   a generally cylindrical second member having one end for defining a coupling end that is engagable with said coupling end of said first member for coaxial coupled relation between said first and second members, said second member having a corresponding axial fluid flow passage therethrough so that when said coupling end of said second member is engaged with said coupling end of said first member a single fluid flow passage is defined through said first and second members;
   at least one detent carried by said first member for securing said second member in coaxial coupled relation with said first member;
   means on said second member for engaging said detent when said first and second members are engaged in coaxial coupled relation;
   a collar carried by said first member and longitudinally movable for alternately maintaining said detent in, and releasing said detent from, engagement with said means on said second member, said collar comprising inner and outer sleeves that define an annular channel therebetween;
   first biasing means for biasing said collar longitudinally toward said coupling end of said first member;
   a plunger carried by said collar and being longitudinally movable in said channel defined by said inner and outer sleeves of said collar;
   second biasing means for biasing said plunger longitudinally toward said coupling end of said first member, said plunger being adapted to be engaged by said second member so that when said second member is engaged with said first member in coaxial coupled relation, said second member urges said plunger into said annular channel to in turn urge said collar to hold said detent in engagement with said engaging means on said second member, thereby securing said first member and said second member in coaxial coupled relation;
   and whereby said collar is manually movable against said second biasing means to release said detent from said engaging means on said second member so that said second member may be released from coaxial coupled relation with said first member.

2. The coupling of claim 1 wherein said first member is a socket and said second member is a plug.

3. The coupling of claim 1 wherein said inner and outer sleeves of said collar comprise separate interlocking sleeves.

4. The coupling of claim 1 wherein said first member and said inner sleeve define an annular passage therebetween for said first biasing means, said first biasing means is a relatively weaker spring, and said second biasing means is a relatively stronger spring.

5. The coupling of claim 4 wherein said relatively weaker spring and said relatively stronger spring comprise helical compression springs that are confined on the side of said detent opposite said coupling end of said first member.

6. The coupling of claim 1 wherein the coupling comprises seals for hydraulic fluids.

7. A quick-action fluid coupling for fluid conducting lines, characterized by push-to-connect, pull-to-disconnect features, said coupling comprising:
   a generally cylindrical socket having an axial fluid flow passage therethrough;
   a generally cylindrical mating plug for being received in said socket in coaxial coupled relation therewith, said socket defining a plug receiving end, and said mating plug having a corresponding axial fluid flow passage therethrough so that when said mating plug is received in said socket a single fluid flow passage is defined through said plug and said socket;
   a plurality of ball detents retained in ball retaining apertures defined by said socket for securing said mating plug in coaxial coupled relation with said socket;
   means on said mating plug for engaging said ball detents when said socket and said mating plug are secured in coaxial coupled engagement;

an annular collar carried by said socket and longitudinally movable for alternately maintaining said ball detents in, and releasing said ball detents from, engagement with said means on said mating plug, said annular collar comprising inner and outer sleeves that define an annular channel therebetween;

first biasing means for biasing said annular collar longitudinally toward said plug receiving end;

a plunger carried by said collar and being longitudinally movable in said channel defined by said inner and outer sleeves of said annular collar;

second biasing means for biasing said plunger longitudinally toward said plug receiving end, said plunger being adapted to be engaged by said plug so that when said plug is received in said socket, said plug urges said plunger into said annular channel to in turn urge said annular collar to hold said ball detents in engagement with said engaging means on said mating plug, thereby securing said socket and said plug in coaxial coupled relation;

and whereby said annular collar is manually movable against said second biasing means to release said ball detents from said engaging means on said mating plug so that said plug may be released from coaxial coupled relation with said socket.

8. The coupling of claim 7 wherein the inner and outer sleeves of said annular collar comprise separate interlocking sleeves.

9. The coupling of claim 7 wherein said first socket and said inner sleeve define an annular passage therebetween for said first biasing means, said first biasing means is a relatively weaker spring, and said second biasing means is a relatively stronger spring.

10. The coupling of claim 9 wherein said relatively weaker spring and said relatively stronger spring comprise helical compression springs that are confined on the side of said ball detents opposite said plug receiving end of said socket.

11. The coupling of claim 7 wherein said coupling comprises seals for hydraulic fluids.

12. The coupling of claim 7 wherein said annular collar and said plunger each include stop means for limiting their movement in one direction.

13. The coupling of claim 9 wherein said inner sleeve further comprises:

an annular projecting shoulder for engaging said ball detents to hold said ball detents in engagement with said engaging means on said plug for coaxial coupled relation of said plug and said socket; and an annular groove adjacent said projecting shoulder on the side of said projecting shoulder opposite said plug receiving end of said socket for engaging said ball detents upon receipt of said plug in said socket so that the annular collar is secured by said detents, said first and second helical compression springs are compressed, and when said engaging means on said mating plug comes into register with said ball retaining apertures, then said annular collar snaps said projecting shoulder into registry with said ball retaining apertures to hold said plug and socket in coaxial coupled relation, said annular groove also providing for releasing said ball detents from engagement with said means on said plug and withdrawing said plug from coaxial coupled relation with said socket.

14. A quick-action fluid coupling for fluid conducting lines, characterized by push-to-connect, pull-to-disconnect features, said coupling comprising:

a generally cylindrical socket having an axial fluid flow passage therethrough;

a generally cylindrical mating plug for being received in said socket in coaxial coupled relation therewith, said socket defining a plug receiving end, and said mating plug having a corresponding axial fluid flow passage therethrough so that when said mating plug is received in said socket a single fluid flow passage is defined through said plug and said socket;

a plurality of ball detents retained in ball retaining apertures defined by said socket adjacent said plug receiving end of said socket for securing said mating plug in coaxial coupled relation with said socket, said ball detents being movable radially inwardly and outwardly with respect to said mating plug;

an annular groove in said mating plug for engaging said ball detents when said socket and said mating plug are secured in coaxial coupled engagement;

an annular inner sleeve carried by said socket, said annular inner sleeve having an annular groove for engaging said ball detents in a radially outward position and an adjacent projecting shoulder for engaging said ball detents in a radially inward position, said annular inner sleeve being longitudinally movable for alternately maintaining said ball detents in a radially inward position, and for engaging said ball detents in a radially outward position, said annular inner sleeve and said socket defining a passage therebetween;

a first helical compression spring located in said passage for biasing said inner sleeve against said socket toward said plug receiving end to provide for receipt of said ball detents in a radially outward position when said plug is inserted into said socket;

an outer sleeve in interlocking engagement with said inner sleeve, said inner and outer sleeves defining an annular channel therebetween;

a plunger longitudinally movable in said channel, said plunger defining an orifice for receipt of said plug into said socket;

an annular shoulder on said plug for engaging said plunger;

a second helical compression spring located in said channel of relatively greater strength than said first helical compression spring for biasing said plunger against said interlocking inner and outer sleeves;

first and second annular ramps on said plug for urging said ball detents radially outwardly into engagement with said annular groove on said inner sleeve as said plug is being inserted into said socket and is being removed from said socket, respectively;

said first annular ramp urging said ball detents into engagement with said annular groove in said inner sleeve as said plug is inserted into said socket to hold said inner and outer sleeves relative to said socket as said annular shoulder on said plug engages said plunger to compress said second helical compression spring, so that when said annular groove in said plug comes into registry with said ball retaining apertures, said groove on said plug receives said ball detents, said interlocking inner and outer sleeves are released, said second helical compression spring compresses said first helical compression spring, and said inner and outer sleeves snap under the bias of the second helical compression spring to bring said projecting shoulder into registry with said ball retaining apertures and to secure said plug and said socket in coaxial coupled relation, said inner and outer sleeves being movable against the bias of said second helical compression spring when said plug and said socket are held in coaxial coupled relation to bring said annular groove in said inner sleeve into registry with said ball retaining apertures, said second ramp on said plug urging said ball detents radially outwardly into engagement with said annular groove on said inner sleeve under the bias of said first and second compression springs, so that said inner and outer sleeves snap to release said plug from said socket.

15. The coupling of claim 14 wherein said first and second helical compression springs are confined on the side of said ball detents opposite said plug receiving end of said socket.

16. The coupling of claim 14 wherein said coupling further comprises:
    stop means to limit movement of said interlocking inner and outer sleeves in one direction; and
    stop means to limit movement of said plunger in one direction.

17. The coupling of claim 14 wherein said plug and said socket further comprise valves and means for biasing said valves for stopping flow through said axial flow passages when said socket and plug are not in coaxial coupled engagement, said valve means cooperating to define said single flow passage through said socket and plug when in coaxial coupled engagement, and said valve means further cooperating to urge said plug out of said socket when said plug is released from said socket.

18. A coupling assembly for connecting and disconnecting two fluid flow lines simultaneously, said coupling assembly comprising:
    two push-to-connect, pull-to-disconnect ball and detent couplings, said couplings each comprising a generally cylindrical first member having an axial fluid flow passage therethrough, one end of said first member defining a coupling end;
    a generally cylindrical second member having one end for defining a coupling end that is engagable with said coupling end of said first member for coaxial coupled relation between said first and second members, said second member having a corresponding axial fluid flow passage therethrough so that when said coupling end of said second member is engaged with said coupling end of said first member a single fluid flow passage is defined through said first and second members;
    at least one detent carried by said first member for securing said second member in coaxial coupled relation with said first member;
    means on said second member for engaging said detent when said first and second members are engaged in coaxial coupled relation;
    a collar carried by said first member and longitudinally movable for alternately maintaining said detent in, and releasing said detent from, engagement with said means on said second member, said collar comprising inner and outer sleeves that define an annular channel therebetween;
    first biasing means for biasing said collar longitudinally toward said coupling end of said first member;
    a plunger carried by said collar and being longitudinally movable in said channel defined by said inner and outer sleeves of said collar;
    second biasing means for biasing said plunger longitudinally toward said coupling end of said first member, said plunger being adapted to be engaged by said second member so that when said second member is engaged with said first member in coaxial coupled relation, said second member urges said plunger into said annular channel to in turn urge said collar to hold said detent in engagement with said engaging means on said second member, thereby securing said first member and said second member in coaxial coupled relation;
    whereby said collar is manually movable against said second biasing means to release said detent from said engaging means on said second member so that said second member may be released from coaxial coupled relation with said first member;
    said coupling assembly further comprising a coupling housing in two mating parts, each part having one of said first members mounted to the housing part for coaxial coupling engagement with the corresponding said second member, the corresponding said second member being mounted in the mating housing part;
    one of said housing parts further comprising a cam having depending cam lugs for cammingly engaging said collars; and
    a pivot shaft connected to said cam for rotating said cam so that said depending cam lugs can engage said collars to move said collars against said second biasing means so that said second members can be disconnected from said first members and said housing parts can be separated.

19. The coupling assembly of claim 18 wherein said first member is a socket and said second member is a plug, and wherein said at least one detent comprises a plurality of ball detents retained in ball retaining apertures defined by said socket for securing said mating plug in coaxial coupled relation with said socket, said coupling assembly further comprising a locking means for preventing said cam from being rotated, said locking means being movable to a position in which said cam is free to rotate.

20. A coupling assembly for connecting and disconnecting two fluid flow lines simultaneously, said coupling assembly comprising:
    two push-to-connect, push-to-disconnect ball and detent couplings, the couplings each comprising a generally cylindrical socket having an axial fluid flow passage therethrough;
    a generally cylindrical mating plug for being received in said socket in coaxial coupled relation therewith, said socket defining a plug receiving end, and said mating plug having a corresponding axial fluid flow passage therethrough so that when said mating plug is received in said socket a single fluid flow passage is defined through said plug and said socket; p1 a plurality of ball detents retained in ball retaining apertures defined by said socket adjacent said plug receiving end of said socket for securing said mating plug in coaxial coupled relation with said socket, said ball detents being movable radially inwardly and outwardly with respect to said mating plug;

an annular groove in said mating plug for engaging said ball detents when said socket and said mating plug are secured in coaxial coupled engagement;

an annular inner sleeve carried by said socket, said annular inner sleeve having an annular groove for engaging said ball detents in a radially outward position and an adjacent projecting shoulder for engaging said ball detents in a radially inward position, said annular inner sleeve being longitudinally movable for alternately maintaining said ball detents in a radially inward position, and for engaging said ball detents in a radially outward position, said annular inner sleeve and said socket defining a passage therebetween;

a first helical compression spring located in said passage for biasing said inner sleeve against said socket toward said plug receiving end to provide for receipt of said ball detents in a radially outward position when said plug is inserted into said socket;

an outer sleeve in interlocking engagement with said inner sleeve, said inner and outer sleeves defining an annular channel therebetween;

a plunger longitudinally movable in said channel, said plunger defining an orifice for receipt of said plug into said socket;

an annular shoulder on said plug for engaging said plunger;

a second helical compression spring located in said channel of relatively greater strength than said first helical compression spring for biasing said plunger against said interlocking inner and outer sleeves;

first and second annular ramps on said plug for urging said ball detents radially outwardly into engagement with said annular groove on said inner sleeve as said plug is being inserted into said socket and is being removed from said socket, respectively;

said first annular ramp urging said ball detents into engagement with said annular groove in said inner sleeve as said plug is inserted into said socket to hold said inner and outer sleeves relative to said socket as said annular shoulder on said plug engages said plunger to compress said second helical compression spring, so that when said annular groove in said plug comes into registry with said ball retaining apertures, said groove on said plug receives said ball detents, said interlocking inner and outer sleeves are released, said second helical compression spring compresses said first helical compression spring, and said inner and outer sleeves snap under the bias of the second helical compression spring to bring said projecting shoulder into registry with said ball retaining apertures and to secure said plug and said socket in coaxial coupled relation, said inner and outer sleeves being movable against the bias of said second helical compression spring when said plug and said socket are held in coaxial coupled relation to bring said annular groove in said inner sleeve into registry with said ball retaining apertures, said second ramp on said plug urging said ball detents radially outwardly into engagement with said annular groove on said inner sleeve under the bias of said first and second compression springs, so that said inner and outer sleeves snap to release said plug from said socket;

said coupling assembly further comprising a housing in two mating parts, each part having one of said sockets mounted to said housing part for coaxial coupling engagement with the corresponding said plug, the corresponding said plug being mounted in the mating housing part;

one of said housing parts further comprising a cam having depending cam lugs for cammingly engaging said collars, said cam having a larger diameter portion and a smaller diameter portion intersecting to form a notch in said cam;

a stop pin for engaging said notch to limit rotation of said cam;

a pivot shaft connected to said cam for rotating said cam so that said depending cam lugs can engage said collars to move said collars against said second helical compression springs so that said plugs can be disconnected from said sockets and said housing parts can be separated;

a cap carrying said pivot shaft and said cam upon which said stop pin is mounted;

a spring in said cap for biasing said pivot shaft and said cam to rotate to the limit of said stop pin when said plugs and sockets are connected;

a handle for rotating said pivot shaft;

a key having a reduced diameter portion for allowing said cam to rotate freely, the key being movable to a position in which said cam is free to rotate so that said plugs, sockets, and housing parts can be separated; and a helical compression spring mounted on said key to prevent rotation of said cam.

* * * * *

UNITED STATES PATENT AND TRADEMARK OFFICE
CERTIFICATE OF CORRECTION

PATENT NO. : 5,092,364
DATED     : March 3, 1992
INVENTOR(S) : Randall J. Mullins It is certified that error appears in the above-identified patent and that said Letters Patent is hereby corrected as shown below:

Column 2, line 4, "Hurst Performance, Inc." should be -- Hurst Emergency Products --.

Column 6, line 14, "16. When" should be -- 16 when --.

Column 6, line 19, "socket 22" should be -- socket 12 --.

Column 6, line 40, "s" should be -- so --.

Column 14, line 64, "p1" should be deleted and a new paragraph should be started.

Signed and Sealed this

Thirty-first Day of August, 1993

Attest:

BRUCE LEHMAN

Attesting Officer

Commissioner of Patents and Trademarks